United States Patent
Haddadian et al.

(10) Patent No.: US 11,035,395 B2
(45) Date of Patent: Jun. 15, 2021

(54) CONNECTION DEVICE FOR AN EXHAUST TURBOCHARGER AND EXHAUST TURBOCHARGER

(71) Applicant: IHI Charging Systems International GmbH, Amt Wachsenburg OT Ichtershausen (DE)

(72) Inventors: Farhad Haddadian, Heidelberg (DE); Klaus Sperling, Heidelberg (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 33 days.

(21) Appl. No.: 16/614,337

(22) PCT Filed: Jul. 4, 2018

(86) PCT No.: PCT/EP2018/000340
§ 371 (c)(1),
(2) Date: Nov. 15, 2019

(87) PCT Pub. No.: WO2019/011463
PCT Pub. Date: Jan. 17, 2019

(65) Prior Publication Data
US 2020/0149569 A1    May 14, 2020

(30) Foreign Application Priority Data

Jul. 14, 2017  (DE) .................... 10 2017 115 935.5
Nov. 22, 2017 (DE) .................... 10 2017 127 588.6
Apr. 11, 2018  (DE) .................... 10 2018 108 550.8

(51) Int. Cl.
*F16B 7/04*     (2006.01)
*F01D 25/24*   (2006.01)
(Continued)

(52) U.S. Cl.
CPC .......... *F16B 7/0453* (2013.01); *F01D 25/243* (2013.01); *F01D 25/26* (2013.01); *F16B 9/02* (2013.01); *F16L 23/04* (2013.01)

(58) Field of Classification Search
CPC .... F01D 25/243; F01D 25/26; F01N 13/1805; F02B 37/00; F16B 7/0453; F16B 7/182;
(Continued)

(56) References Cited

U.S. PATENT DOCUMENTS 978,398  A  * 12/1910  Rischard .................. F16L 3/237
                                                              24/339
2,548,216 A  *  4/1951  Houghton ........... F01N 13/1855
                                                              285/408
(Continued)

FOREIGN PATENT DOCUMENTS

DE      19534437 A1    3/1997
DE      19650674 A1    6/1998
(Continued)

OTHER PUBLICATIONS eEuroparts.com: SAAB Pipe Clamp (55559479).URL: http://www.eeuroparts.com/Parts/33472/Pipe-Clamp-Turbo-Inlet-55559479/ archived copy as of Aug. 26, 2016 retrieved from https://web.archive.org/web/20160826013409/https://www.eeuroparts.com/Parts/33472/Pipe-Clamp-Turbo-Inlet-55559479/ on Sep. 16, 2019.
(Continued)

*Primary Examiner* — Jesse S Bogue

(57) ABSTRACT

A connection device for an exhaust gas turbocharger includes an essentially bent first element and an essentially bent second element. The first element has a radially extending first clamping arm in a first end region and the second element has a radially extending second clamping arm in the first end region opposite the first clamping arm. The first element is movably connected with the second element in a second end region. The first clamping arm and the second
(Continued)

clamping arm may be movably connected by a first connecting element of the connection device. The first element comprises a first supporting portion and the second element comprises a second supporting portion between the two end regions. A stiffening element is formed in a transition region between the clamping arm and the supporting portion for increasing the strength of the connection device.

10 Claims, 7 Drawing Sheets

(51) Int. Cl.
    *F01D 25/26*     (2006.01)
    *F16B 9/02*     (2006.01)
    *F16L 23/04*     (2006.01)

(58) Field of Classification Search
    CPC .. F16B 9/02; F16L 23/04; F16L 23/08; Y02T 10/12
    See application file for complete search history.

(56) References Cited

U.S. PATENT DOCUMENTS

| | | | |
|---|---|---|---|
| 3,788,677 A * | 1/1974 | Stade | F01N 13/1805 285/367 |
| 4,606,111 A * | 8/1986 | Okazaki | B21D 53/36 29/463 |
| 5,131,698 A * | 7/1992 | Calmettes | F01N 13/1805 285/419 |
| 5,782,499 A | 7/1998 | Gfrerer et al. | |
| 5,940,939 A * | 8/1999 | Geppert | F16B 2/08 24/20 R |
| 6,383,315 B1 | 5/2002 | Kreipe et al. | |
| 7,055,223 B2 * | 6/2006 | Cassel | F16L 21/065 24/20 R |
| 8,662,544 B2 * | 3/2014 | Broderick | F16L 27/073 285/334.5 |
| 9,039,046 B2 * | 5/2015 | Beagen, Jr. | F16L 19/043 285/367 |
| 9,593,788 B2 * | 3/2017 | Rigollet | F16L 21/065 |
| 10,612,705 B2 * | 4/2020 | Prevot | F16L 59/184 |
| 2005/0253029 A1 * | 11/2005 | Gibb | F16L 21/065 248/158 |
| 2007/0022574 A1 | 2/2007 | Belisle et al. | |
| 2007/0176425 A1 | 8/2007 | Ma et al. | |
| 2010/0296925 A1 * | 11/2010 | Sakai | F01D 25/243 415/214.1 |
| 2013/0091832 A1 | 4/2013 | Friedrich et al. | |
| 2015/0008663 A1 * | 1/2015 | Drivon | F16L 59/184 285/45 |
| 2015/0204471 A1 | 7/2015 | Sato | |
| 2015/0267729 A1 | 9/2015 | Baudoin et al. | |
| 2015/0315954 A1 * | 11/2015 | Edemann | B21D 53/36 285/420 |
| 2017/0328501 A1 | 11/2017 | Motoyama | |

FOREIGN PATENT DOCUMENTS

| | | |
|---|---|---|
| DE | 102012218201 A1 | 4/2013 |
| DE | 102014103683 A1 | 9/2015 |
| EP | 0085021 A1 | 8/1983 |
| EP | 0928921 A1 | 7/1999 |
| EP | 2233719 A1 | 9/2010 |
| EP | 3246612 A1 | 11/2017 |
| GB | 2518220 A | 3/2015 |
| GB | 2528094 A | 1/2016 |
| WO | 2014016721 A1 | 1/2014 |
| WO | 2014071950 A1 | 5/2014 |
| WO | 2019011462 A1 | 1/2019 |
| WO | 2019011464 A1 | 1/2019 |

OTHER PUBLICATIONS

U.S. Appl. No. 16/614,337, dated Nov. 15, 2019, Farhad Haddadian.

* cited by examiner

CONNECTION DEVICE FOR AN EXHAUST TURBOCHARGER AND EXHAUST TURBOCHARGER

TECHNICAL FIELD

The invention relates to a connection device for an exhaust gas turbocharger and to an exhaust gas turbocharger.

BACKGROUND

An exhaust gas turbocharger suitably consists of several casing sections: A first casing section which is generally flown through by hot gases, normally by exhaust gas of a combustion engine, a second casing section which is configured to accommodate a rotor assembly which is rotatably supported in the second casing section and is positioned between the first casing section and a third casing section which may generally be flown through by ambient air. Flange surfaces are formed between the individual casing sections in such a manner that these flange surfaces are contacting each other so that the hot gas and the ambient air are prevented from escaping as far as possible. If leakages occur between the flange surfaces, the total efficiency of the exhaust gas turbocharger will be reduced, on the one hand, and, on the other hand, environmentally harmful exhaust gases will exit between the first casing section and the second casing section, which, in particular, has to be prevented. It has to be taken into consideration that the exhaust gas turbocharger should be able to be disassembled, i. e. that for example a material bond connection between the individual flange surfaces might provide tightness between the flange surfaces, however, the exhaust gas turbocharger may then no longer be able to be easily disassembled and reinstalled.

A connection between the first casing section which is flown through by exhaust gas and the second casing section which is flown through by air or lubricant and/or water is highly problematic, because here large temperature differences as well as temperature variations between the casing sections occur. This means that the connection device has to compensate for a different thermal expansion of the casing sections and is itself subject to different and varying stresses.

The connection device is usually formed like a pipe clamp, wherein two elements extending over a circumference of the connection device are at their ends facing each other detachably connected at least on one side by means of a screw-bolt connection.

From the laid open publication DE 10 2014 103 683 A1, for example, a profiled clamp may be taken, whose ends of the elements facing one another in the region of the screw-bolt connection are provided with a nose each so that flange portions of the elements are preferably exclusively in contact with the noses. The elements are profiled and comprise flanks which are formed trapezoidal because the profiled clamp is intended for making a taper flange connection.

During operation of an exhaust gas turbocharger comprising the connection device, high tensile and compressive stresses occur at certain places of the connection device, usually in end regions of the essentially shell-shaped elements which are connected with each other. These tensile and compressive stresses may lead to elongations and, in the worst case, to failure by rupture during operation.

SUMMARY

The object of the present disclosure is to provide a connection device for an exhaust gas turbocharger which ensures a reliable connection. The additional object is the indication of an improved exhaust gas turbocharger.

This object is solved by a connection device for an exhaust gas turbocharger as described. The additional object is achieved by an exhaust gas turbocharger as described.

The disclosure relates to a connection device for an exhaust gas turbocharger with an essentially bent first element and an essentially bent second element. The first element comprises a radially extending first clamping arm at a first end region of the connection device and the second element comprises a radially extending second clamping arm at a first end region opposite the first clamping arm. The first element is formed movably connected with the second element in a second end region facing away from the first end region. The first clamping arm and the second clamping arm are connectable by means of a first connecting element, wherein in particular by means of the first connecting element a circumferential force is provided for clamping the connecting elements together. The first element comprises a first supporting portion and the second element comprises a second supporting portion between the two end regions. A stiffening element for increasing the strength of the connection device is formed in a transition region between the clamping arm and the supporting portion. High tensile and compressive stresses occur in the transition region, which may be prevented by means of the stiffening element to excessively deform the elements in the transition regions. In the transition region a tensile stress at the inner circumference or a compressive stress, respectively, at the outer circumference of the connection device occurs which is just high enough to enable an elastic deformation of the transitions for contact-making between the stops. Thereby, a uniform distribution of circumferential stress acting in the elements may be achieved.

By means of the stiffening elements, in particular if the two end regions comprise stiffening elements, stresses which have developed over the circumference of the connection device may be distributed more uniformly. This means in other words that an accumulation of the respective stress in the transition region may be absorbed without damage. The result is an improved stability during operation of the exhaust gas turbocharger, because deformation which in particular occurs under varying operating temperatures of the exhaust gas turbocharger is significantly reduced due to the better stress distribution.

In particular, the connecting element may also be made more lightweight, because the material thickness of the connecting element may be reduced because of the stiffening elements.

The connecting element comprises an especially secure clamping if the two elements in the transition regions have the stiffening element at both end regions.

In a further embodiment of the connection device, the stiffening element is formed centrally extending along a center axis of the connection device, or the stiffening element is arranged axially offset relative to the center axis. The positioning of the stiffening element is advantageous in that a profile is obtained which is symmetric to the center axis, wherein also during installation of this connection device made in this manner, no particular orientation of the connection device has to be observed. However, if the stiffening element is formed asymmetrically, in particular relative to the center axis, an axially differing heat input into the connection device, i.e. on the left hand and right hand side of the center axis, which results from different heating of the two casing sections, may be accounted for, and thus the stiffening may be arranged specifically in respect of the maximum tensile and compressive stresses.

The stiffening element is preferably formed as a bead which, in particular with a connecting element made from sheet metal may be manufactured in a cost-effective deep-drawing method.

The stiffening element may be formed convex or concave, wherein it extends outwardly or inwardly. The suitable extension may, for example, be selected depending on the given installation spaces, also related to an existing space during installation.

Preferably, the elements are formed profiled comprising a cross-sectional profile. Thereby an improved overall elasticity of the connection device may be achieved which leads to an improved relative adaption of the connection device to the casing sections to be connected. If the cross-sectional profile is preferably formed U-shaped and/or trapezoidal the two casing sections may each be encompassed by a leg of the profile in such a manner that the two casing sections may securely be accommodated in an intermediate space which is formed by the legs and are clamped between the two legs.

In a further embodiment, the first element and the second element are movably formed in the second end region by means of a second connecting element, wherein the second connecting element in particular is formed as a chain link, wherein the first element and/or the second element may be inserted through the chain link. Principally, the movable connection leads to an improved and simplified installation of the connection device, wherein the installation may be further improved by making the connection by means of a chain link. This means that each element may be mounted relatively movably in the direction of the three-dimensional space at the chain link and that thereby a movement of the two elements relative to each other compared to, for example, a connection of the elements with an elastic connecting band is considerably enhanced. An improvement of the distribution of the acting circumferential stress after installation in the connection device is achieved by means of inserting the first element and/or the second element through the chain link.

In order to obtain an adequate section modulus of the element comprising the stiffening element, the stiffening element has a width to be determined, a corresponding length and a corresponding optimized shape, wherein the maximum width has a value which is not greater than that of a width of the band. The optimized shape is matched to the axial force component to be introduced which is distributed around the circumference.

The second aspect relates to an exhaust gas turbocharger comprising a first casing section which may in particular be flown through by hot exhaust gas and a second casing section, wherein the first casing section and the second casing section are connected with each other by means of a connection device. The connection device is configured as described.

During operation of the exhaust gas turbocharger, the casing sections exhibit a thermal expansion due to high exhaust gas temperatures. In order to allow this thermal expansion without significantly affecting the efficiency of the exhaust gas turbocharger, the connection device is configured as described. This results in a safe connection between the casing sections, and thus in a reduction or elimination of leakage of harmful substances.

A further improved safe connection may be obtained, in that a stiffening element of the connection device is formed axially offset relative to a center axis of the connection device, wherein it has a smaller distance from a leg of the connection device which rests against the first casing section than from a leg which rests against a second casing section. It is therefore possible to take the increased heat input into the connection device on the side of the first casing section, which is flown-through by hot exhaust gas into consideration and to specifically stiffen the side of the connection device facing the first casing section.

Further advantages, features and details of the invention result from the following description of preferred exemplary embodiments as well as from the drawing. The above-mentioned features and feature combinations as well as the features and feature combinations in the following description of the figures and/or shown in the figures alone are not only applicable in the indicated combination but also in other combinations or alone.

DETAILED DESCRIPTION

Figure 1:
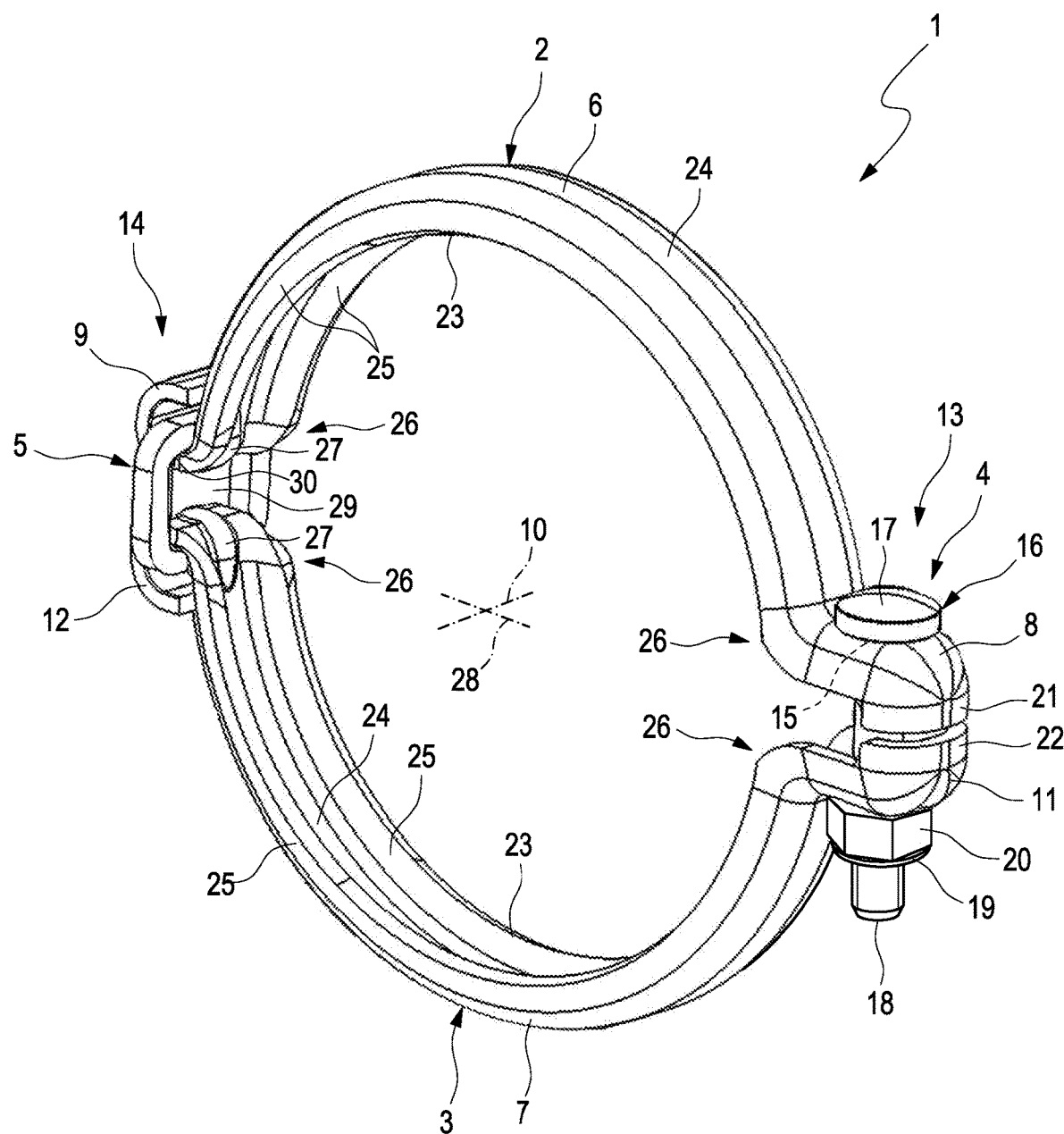
FIG. 1 shows a perspective view of a connection device for an exhaust gas turbocharger in a first exemplary embodiment.

An exhaust gas turbocharger (not shown in detail) comprises a first casing section as a flow-through exhaust gas guide portion which during operation of the exhaust gas turbocharger is flown through by a fluid, generally by exhaust gas. The exhaust gas is generally, but not necessarily, a combustion product of a combustion engine (not shown in detail).

Furthermore, the exhaust gas turbocharger comprises a second casing section, which is formed as a bearing portion and serves to support the rotor assembly of the exhaust gas turbocharger. The bearing portion is positioned between a flow-through air guide portion (also not shown in detail) of the exhaust gas turbocharger and the exhaust gas guide portion.

The rotor assembly (not shown in detail) comprises a compressor wheel and a turbine wheel, which are connected non-rotatably with each other via a shaft. The compressor wheel is arranged in a compressor wheel chamber of the air guide portion to take in generally fresh air. The turbine wheel is rotatably accommodated in a wheel chamber of the exhaust gas guide portion.

During operation of the exhaust gas turbocharger, the turbine wheel is subjected to the exhaust gas flowing through the exhaust gas guide portion and driven by it so that it may perform a rotary movement. This rotary movement may be transferred to the compressor wheel via the shaft, which thereby simultaneously to the rotary movement of the turbine wheel may perform a rotary movement. By means of the compressor wheel and its rotary movement, fresh air is taken in which is compressed in the air guide portion.

The exhaust gas turbocharger is mechanically and thermodynamically coupled with the combustion engine, and during operation of the combustion engine and thus during operation of the exhaust gas turbocharger, vibrations occur which act on the exhaust gas turbocharger. In addition, the exhaust gas turbocharger is subjected to varying stresses due to varying temperatures of the flowing through exhaust gas with varying elongations in particular of the exhaust gas guide portion.

The exhaust gas guide portion comprises a first flange surface at its end facing the bearing portion. Opposite this first flange surface, a second flange surface of the bearing portion is formed, wherein the two flange surfaces are formed mainly complementary.

The two flange surfaces are formed to extend both radially as well as in the circumferential direction relative to a longitudinal axis of the exhaust gas turbocharger, which corresponds to an axis of rotation of the turbine wheel. The exhaust gas guide portion comprises a first portion collar opposite the bearing portion, which is associated with an axially adjacent second portion collar of the bearing portion. The first flange surface and the second flange surface extend over the first portion collar and the second portion collar, respectively.

The exhaust gas guide portion and the bearing portion are connected with each other by a connection device 1 in the region of the flange surfaces. The connection device 1 comprises a first element 2 which is mainly bent in the circumferential direction and a second element 3 which is mainly bent in the circumferential direction, which on one end are detachably connected with each other by means of a first connecting element 4 and on the other end are movably connected with each other by means of a second connecting element 5, see FIG. 1 which shows a first exemplary embodiment of the connection device 1 in a perspective view. The connection device 1 is basically formed similar to a pipe clamp connection. Thus, for the connection of the two casing sections a band-shaped connection device 1 is provided which at least partially encompasses the circumference of the first portion collar and the second portion collar in the radial, in the axial and in the circumferential direction.

The elements 2, 3 each comprise an essentially bent, in particular segment-shaped supporting portion 6; 7. The first supporting portion 6 of the first element 2 has a radially outwardly extending first clamping arm 8 at its one end and at its end facing away from the first clamping arm 8 a hook-shaped first safety portion 9 which also extends outwardly. It should be noted that 'outer, outwardly' indicates the region which lies on the side of the connection device 1 facing away from a longitudinal axis 10 of the connection device 1. In the following, the region between the connection device 1 and the longitudinal axis 10 will be referred to as 'inner, inwardly'.

The second supporting portion 7 of the second element 3 has a radially outwardly extending second clamping arm 11 at its one end, and at its end facing away from the second clamping arm 11 a hook-shaped second safety portion 12 which also extends outwardly.

The two elements 2, 3 are arranged opposite each other in such a manner that they form a more or less circular inner space encompassing it, wherein the two clamping arms 8, 11 opposite form a first end region 13 of the connection device 1 and the two safety portions 9, 12, also opposite, form a second end region 14 of the connection device 1.

An opening 15 each is formed in the clamping arms 8, 11, through which an insert element 16 of the first connecting element 4, the screw, may be inserted. A head 17 of the insert element 16 is formed to rest on the first clamping arm 8 so that the insert element 16 may bear against the first clamping arm 8. At the insert element end 18 facing away from the head 17, a clamping disk 18 and a safety element 20 are arranged, so that the two elements 2, 3 may be clamped together through a preload force of the first connecting element 4. The first end region 13 comprises the first connecting element 4 which is formed as a form and force-fitting-connecting element and in particular as a screw-nut element.

The second end region 14 in which the two hook-shaped safety portions 9, 12 of the two elements 2, 3 are formed comprises the second connecting element 5 for a movable connection of the two elements 2, 3, which is formed as a chain link.

The two clamping arms 8, 11 comprise one stop each at their ends facing away from the supporting portions 6, 7, i. e. the first clamping arm 8 comprises a first stop 21 and the second clamping arm 11 comprises a second stop 22. The two stops 21, 22 serve for an improved force introduction in the circumferential direction of the connection device 1 with the two casing sections being preloaded by means of the connection device 1.

The two elements 2, 3 are made from a profiled material for a relative adaptation of an inner circumference 23 of the connection device 1 to an outer circumference of the portion collars with legs 25 between a band 24 which exhibits an essentially trapezoidal profile. It could as well exhibit an essentially U-shaped or otherwise designed profile which is suited for the application range.

To achieve an improved strength of the transition regions 26 formed between the supporting portions 6, 7 and their ends 8, 11, 9, 12, stiffening elements 27 are provided. The transition regions 26 are those places where tensile and compressive stresses occur during operation, because in particular an intensive material reshaping is present in the end regions 13, 14.

For reducing these tensile and compressive stresses, the first element 2 and the second element 3 are provided with the stiffening elements 27.

In the first exemplary embodiment which is configured according to FIG. 1, a stiffening element 27 is formed in the transition region 26 between the safety portion 9; 12 and the supporting portion 6; 7. The stiffening element 27 is preferably formed as a bead. The bead 27 is formed extending inwardly, thus the band 24 is formed convex in the region of the bead 27 in relation to the longitudinal axis 10.

Figure 2:
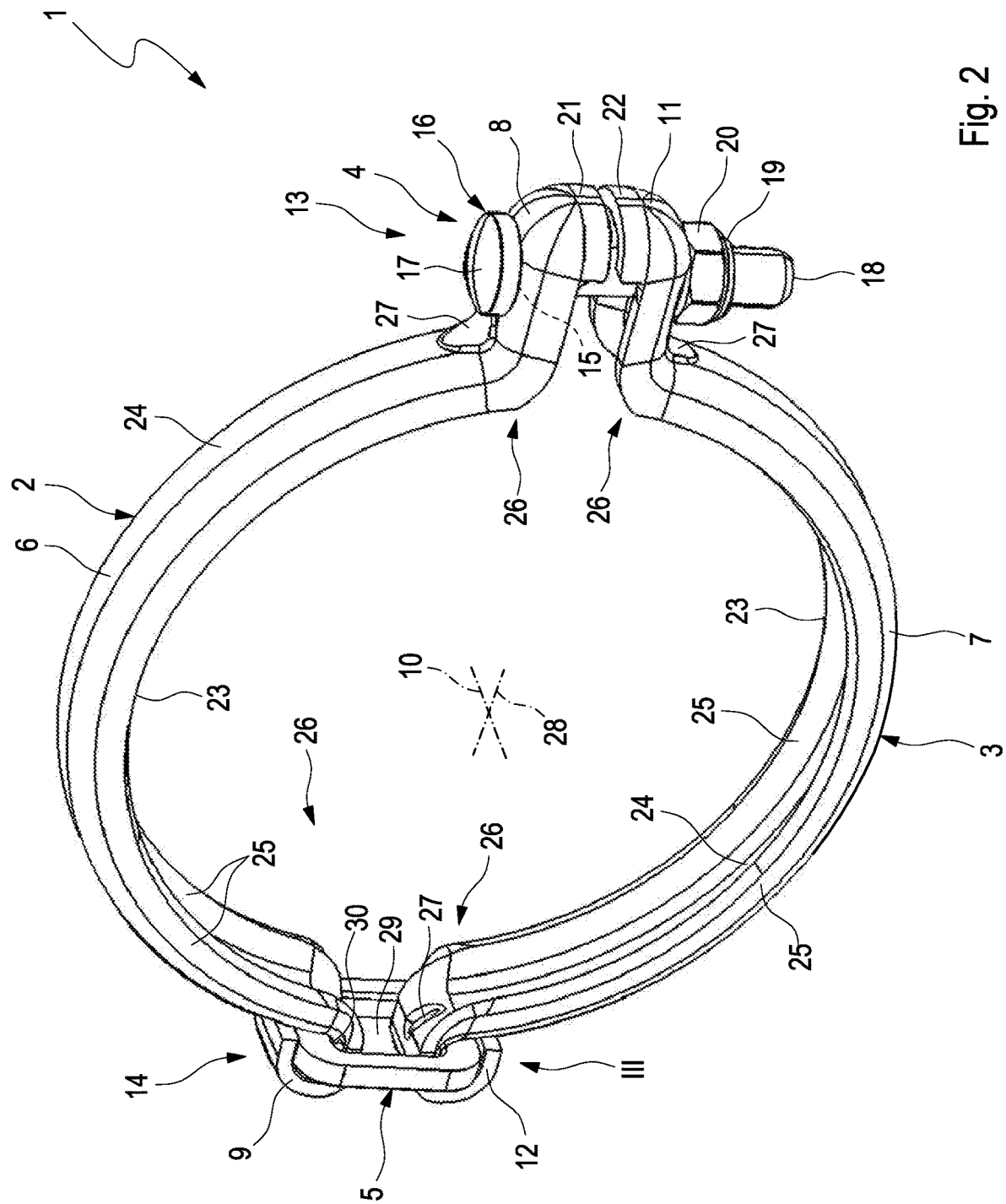
FIG. 2 shows a perspective view of the connection device in a second exemplary embodiment.

FIG. 2 shows a perspective view of the connection device 1 in a second exemplary embodiment. In addition to the transition regions 26 formed in the second end region 14, the transition regions 26 formed in the first end region 13 also comprise a stiffening element 27 each formed as a bead. In the second exemplary embodiment, the beads 27 are formed concave in relation to the longitudinal axis 10, which means in other words they extend outwardly.

The stiffening elements 27 each are formed in the axial centre of the elements 2, 3. In particular this leads to an increase in stiffness and strength in the highly loaded transition region, such that cracking starting from an outer edge of the respective leg 25 is prevented.

Figure 3:
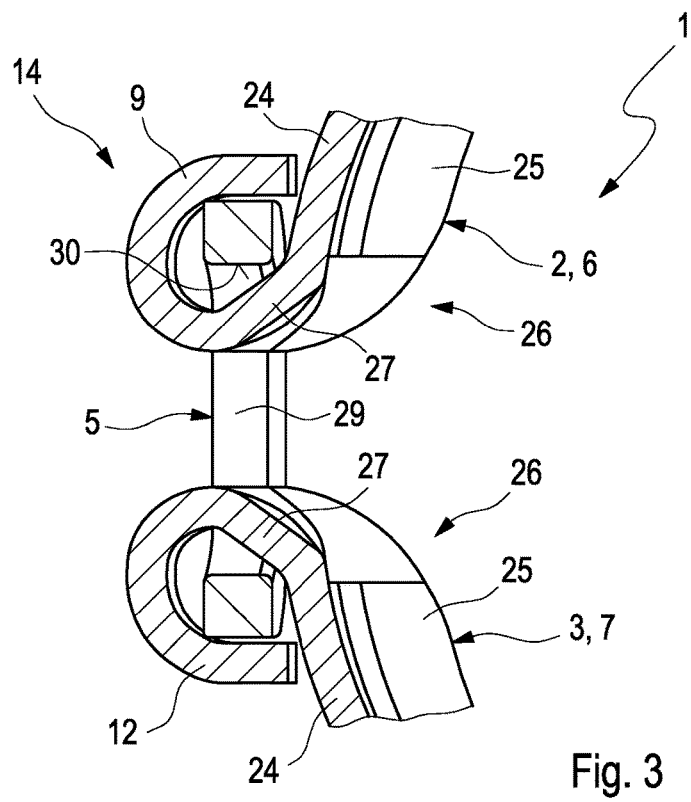
FIG. 3 shows a cross-section with a cut-out III of the connection device according to FIG. 2.

FIG. 3 shows a cut-out III of the connection device 1 according to the second exemplary embodiment. The cut-out III comprises the second end region of the connection device, wherein this is shown in a perspective cross-section along a centre axis 28 of the connection device 1.

The second connecting element 5 is accommodated in the two safety portions 9, 12, wherein starting from an inner space 29 of the second connecting element 5 the two safety portions 9, 12 extend winding about the second connecting element 5. The bead 27 is formed in the two elements 2, 3 axially protruding into the inner space 29.

Figure 4:
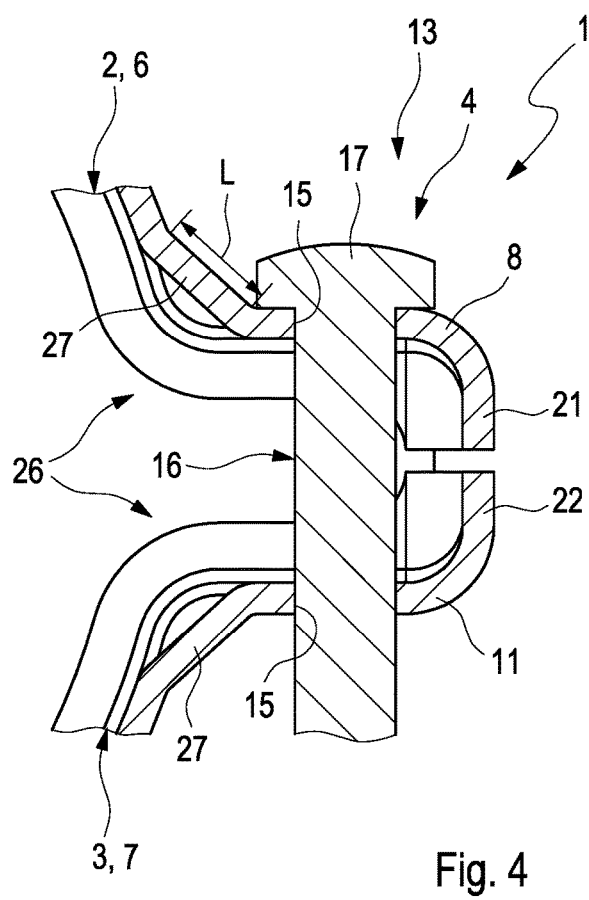
FIG. 4 shows a longitudinal section of a first end region of the connection device according to FIG. 2.

FIG. 4 shows a longitudinal section of the first end region 13 of the connection device 1 according to the second exemplary embodiment. The stiffening element 27 is formed in the transition region 26 outwardly extending, i. e. concave in relation to the longitudinal axis 10 and extends in the direction of the first stop 21 not further than to the head 17 of the insert element 16. Thus, the maximum radial extension of the stiffening element 27 in the outward direction may be established by means of the first connecting element 4 and its head 17 because the stiffening elements 27 are preferably identically configured in the total of four transition regions 26 of the connection device 1.

Figure 5:
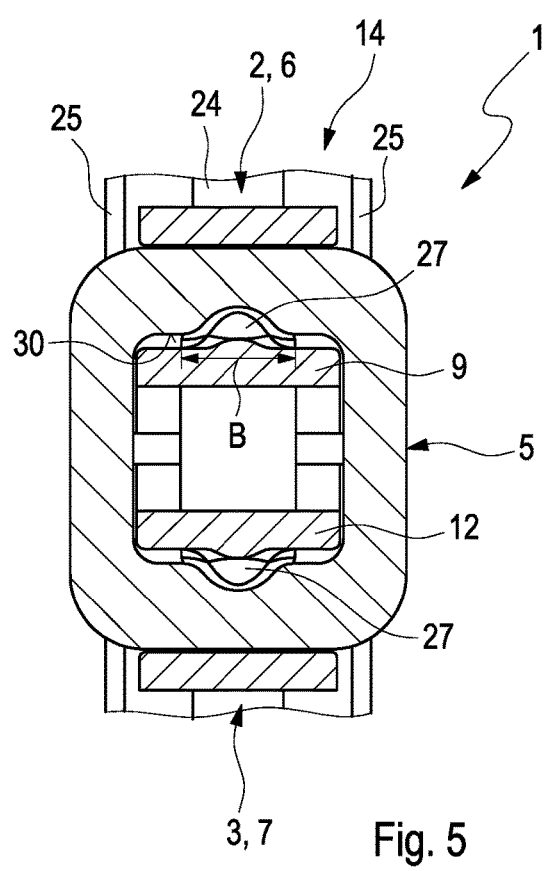
FIG. 5 shows a cross-section of a second end region of the connection device according to FIG. 2.

Because the stiffening element 27 is formed extending into the inner space 29 of the second connecting element 5 the second connecting element 5 is adapted to the stiffening element 27, see FIG. 5. This means in other words that at least one inner surface 30 of the second connecting element 5, which is formed opposite the safety portion 9; 12 and limits the inner space 29 is configured complementary to the stiffening element 27 which is arranged in the adjacent transition region 26. This is advantageous in particular with a stiffening element 27 which is convex in relation to the longitudinal axis 10, so that a correspondingly great expansion of the connection device 1 may be obtained during installation.

Figure 6:
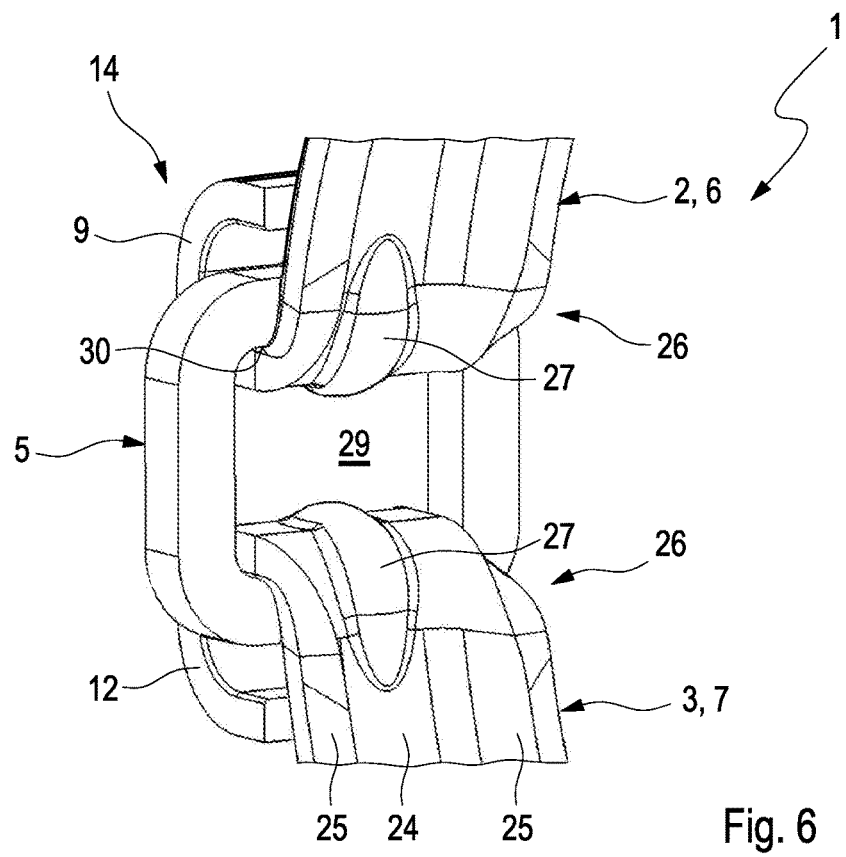
FIG. 6 shows a perspective view of the second end region of the connection device according to FIG. 1.
Figure 7:
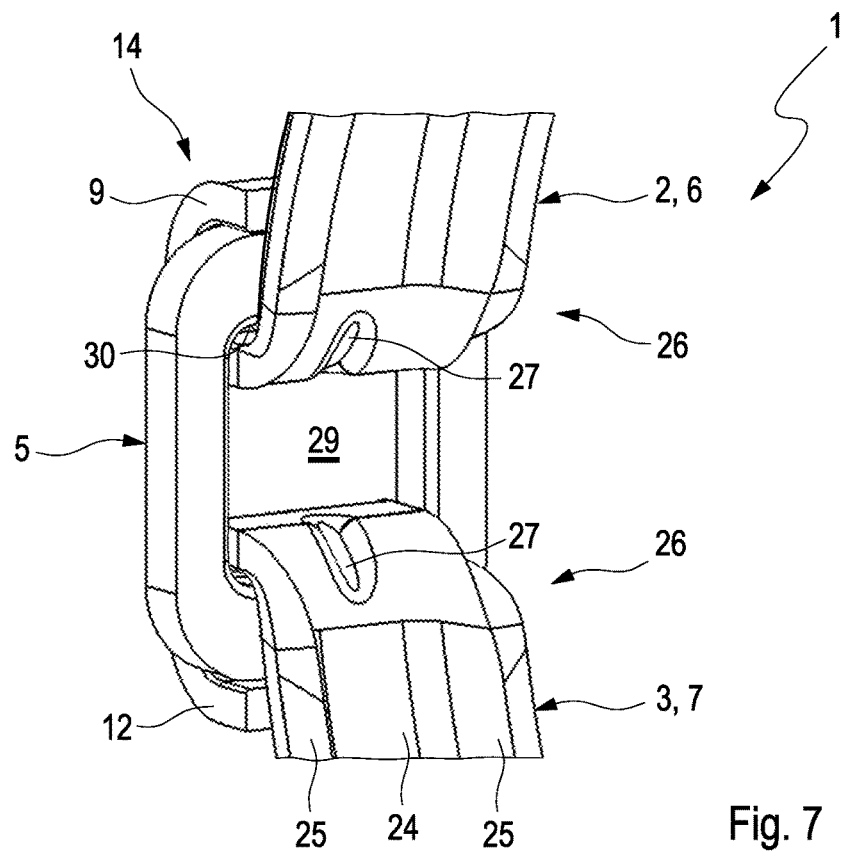
FIG. 7 shows a perspective view of the second end region of the connection device according to FIG. 2.

FIGS. 6 and 7 are perspective views of the second end region 14 of the connection device 1 according to the first exemplary embodiment and according to the second exemplary embodiment, respectively, wherein the stiffening element 27 formed in this end region 14 is inwardly curved in relation to the longitudinal axis 10 in the first exemplary embodiment and outwardly curved in the second exemplary embodiment, wherein the stiffening element 27 is accommodated between the two legs 25 which limit the band 24.

Figure 8:
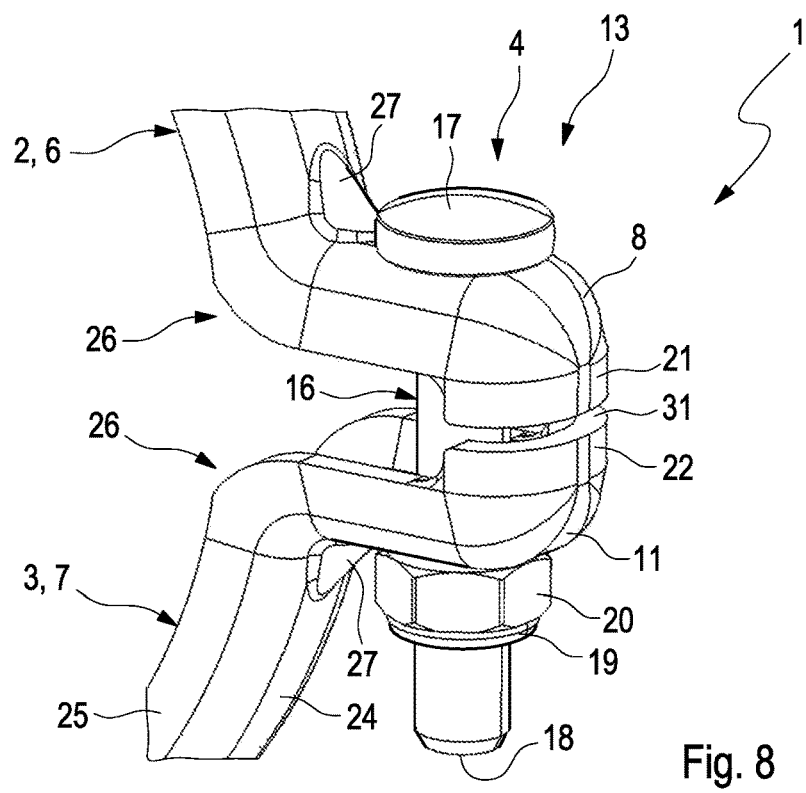
FIG. 8 shows a perspective view of the first end region of the connection device according to FIG. 2 in a front view.
Figure 9:
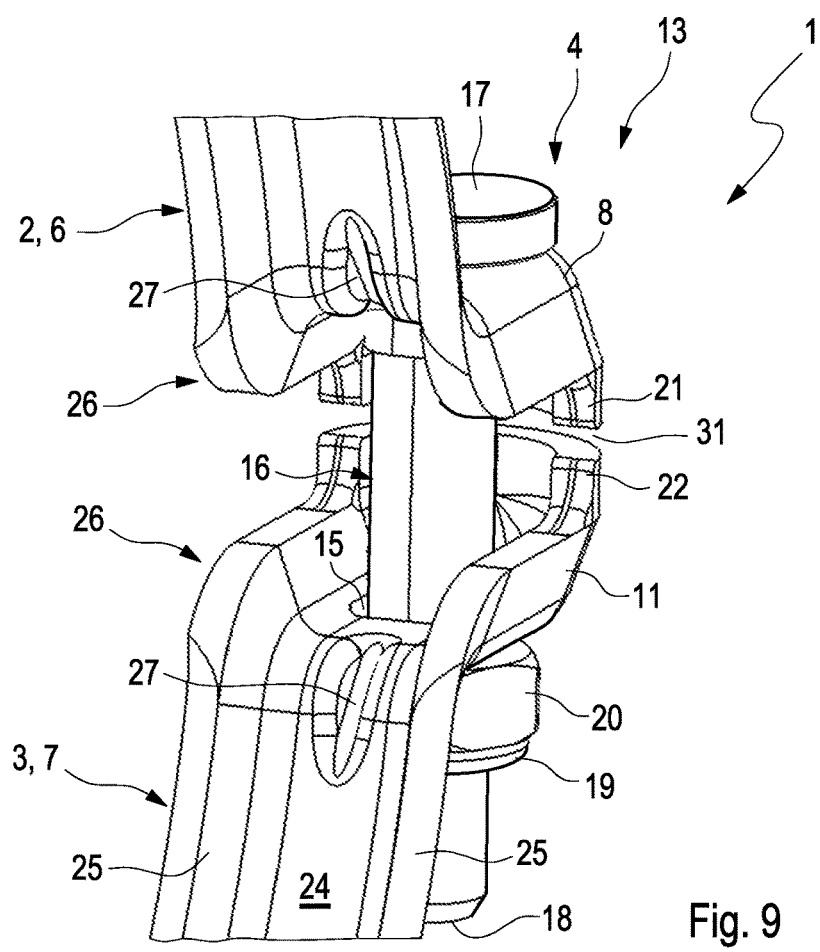
FIG. 9 shows a perspective view of the first end region of the connection device according to FIG. 2 in a rear view.

FIGS. 8 and 9 show perspective views of the first end region 13 of the connection device 1 according to the second exemplary embodiment when viewed from the outside and when viewed from the inside, respectively, in other words, in a front view in a rear view respectively, wherein the outward curvature of the stiffening element 27 is clearly discernible.

Figure 10:
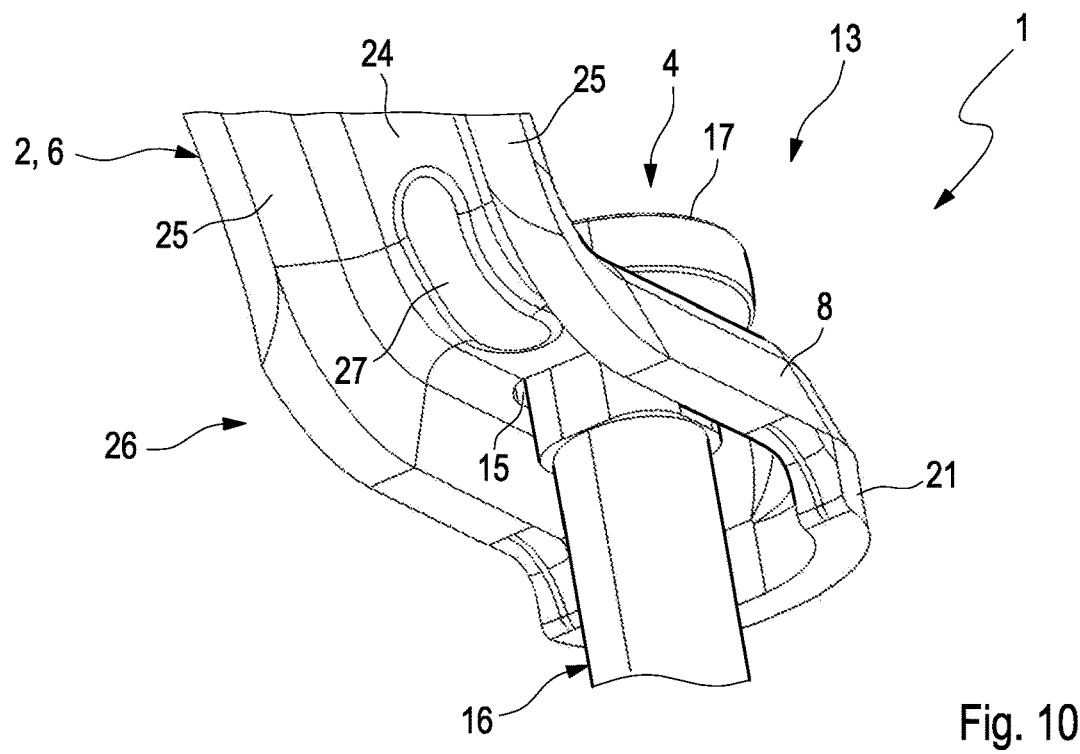
FIG. 10 shows a perspective cut-out of the first end region of the connection device in a third exemplary embodiment in a rear view.
Figure 11:
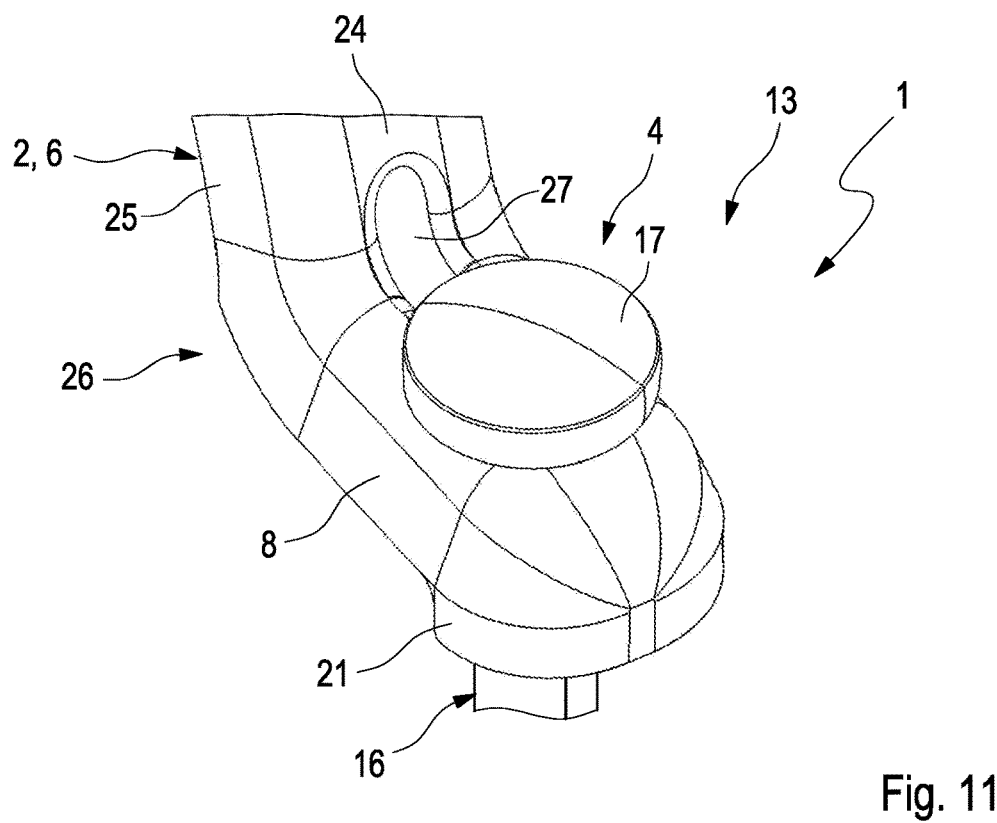
FIG. 11 shows a perspective cut-out of the first end region of the connection device according to FIG. 10 in a front view.

FIGS. 10 and 11 show perspective cutouts of the first end region 13 of the connection device 1 in a third exemplary embodiment in a rear view, i.e. when viewed from the inside and in a front view, i. e. when viewed from the outside, respectively. The stiffening element 27 according to the third exemplary embodiment has a longitudinal shape with rounded ends, wherein a width B of the stiffening element 27 is constant over its length L, with the exception of the rounded ends. In comparison, the stiffening element 27 of the first exemplary embodiment and of the second exemplary embodiment exhibit a width B which increases up to the centre of length L.

It goes without saying that the shape of the stiffening element 27 is not limited to the exemplary embodiments, but may take any design.

Figure 12:
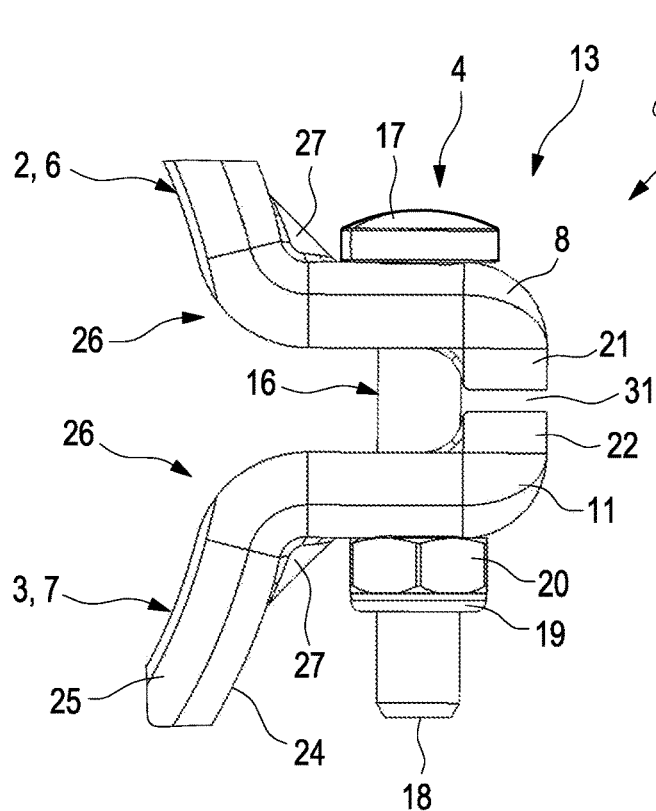
FIG. 12 shows a side view of the first end region of the connection device according to FIG. 2 in the opened condition.
Figure 13:
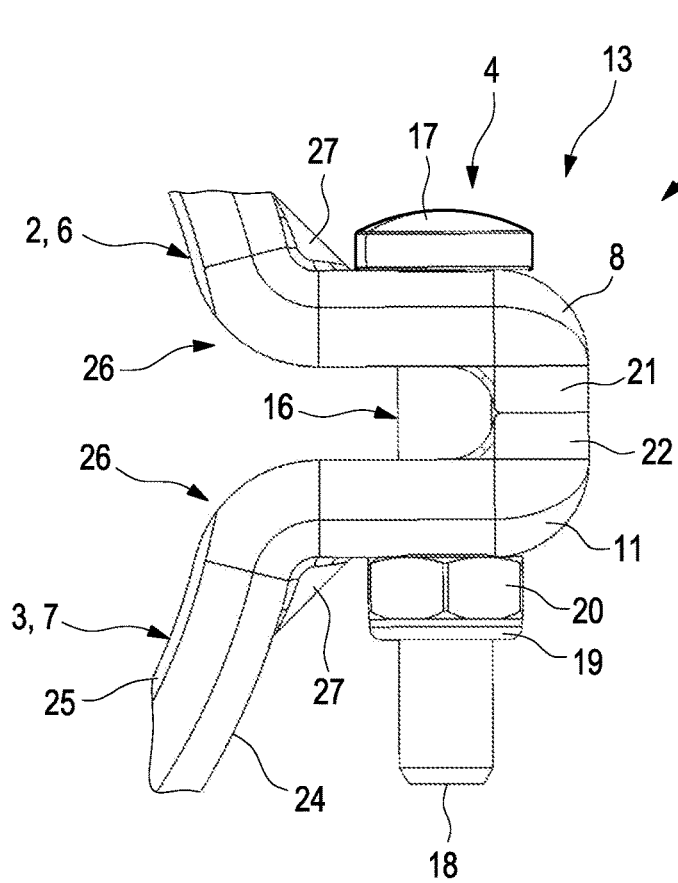
FIG. 13 shows a side view of the first end region of the connection device according to FIG. 2 in the closed condition.

FIGS. 12 and 13 each show a side view of the first end region 13 of the connection device 1 by means of the second exemplary embodiment in the opened condition and in the closed condition, respectively. The opened condition represents an assembly condition wherein the circumference of the connection device 1 is closed by means of the first connecting element 4, but the connection device 1 is not yet completely clamped and connected with the two casing sections. This means, a gap 31 is formed between the stops 21, 22.

In the closed condition as shown in FIG. 13, the gap 31 is eliminated because of a contact of the two stops 21, 22, but in this condition, too, the connection device 1 is still not completely clamped with the two casing sections. A force which brings about the complete clamping of the connection device 1 with the casing sections is provided by further clamping the nut-screw connection in the present exemplary embodiment, wherein the two adjacent transition regions 26 opposite the stops 21, 22 are approaching one another, until a maximum moment which acts in particular on the supporting portions 6, 7 is reached by the first connecting element 4, which leads to a complete clamping of the components.

The transition regions 26 are to be implemented in such a manner that after a material reshaping of the profiled material a tensile stress or a compressive stress, respectively, just high enough is generated in legs 25 so that an elastic deformation of the transition regions 26 for contact-making between the stops 21, 22 is possible.

An elasticity of the transition regions 26 which serves to generate an axial force between the legs 25 of the elements 2, 3 is achieved by means of the stiffening elements 27 which are arranged between the legs 25. This means that a variable cross-section 36 in the transition regions 26 is designed in such a manner that an elastic deformation of the supporting portions 6, 7 at a sufficient stiffness of the transition regions 26 at a simultaneous absorption of tensile or compressive stresses, respectively, is possible to introduce a circumferential stress into the supporting portion 6; 7.

For making a firm and unmovable connection of the two casing sections by means of the connection device 1, the first connecting element 4 is preloaded after positioning of the connection device 1 which is arranged encompassing the two casing sections, wherein the two stops 21, 22 are pressed upon one another until the two clamping arms 8, 11 again lie at an angle relative to one another, wherein, however, a maximum distance is formed between the two clamping arms 8, 11 in the transition region 26.

The two safety portions 9, 12 are preferably configured in the shape of a crane hook, which means in other words that they accommodate the second connecting element 5 secured against an essentially axial displacement along the center axis 28.

In an exemplary embodiment (not shown in detail) the stiffening elements 27 are arranged axially offset, which means in other words, that their center lines relative to their longitudinal extension do not coincide with the center axis 28 but are offset from this center line in the direction of the turbine casing.

The invention claimed is:

1. A connection device for an exhaust gas turbocharger, comprising:
an essentially bent first element (2); and
an essentially bent second element (3),
wherein the first element (2) comprises a radially extending first clamping arm (8) in a first end region (13) of the connection device (1) and the second element (3) comprises a radially extending second clamping arm (11) in the first end region (13) opposite the first clamping arm (8), and
wherein the first element (2) is movably connected with the second element (3) in a second end region (14) of the connection device (1), which faces away from the first end region (13),
and wherein the first clamping arm (8) and the second clamping arm (11) may be movably connected by a first connecting element (4) of the connection device (1), and
wherein the first element (2) comprises a first supporting portion (6) and the second element (3) comprises a second supporting portion (7) between the first and the second end region (13, 14), the first supporting portion (6) and the second supporting portion (7) each having a U-shaped or trapezoidal cross-sectional profile with two legs (25) extending radially inwardly from a central band (24), and
wherein a first stiffening element (27) is arranged in a first transition region (26) between the first clamping arm (8) and the first supporting portion (6), the first stiffening element being a bead which extends inwardly from the central band axially between the legs of the first element (2), and
wherein a second stiffening element (27) is arranged in a second transition region (26) between the second clamping arm (11) and the second supporting portion (7), the second stiffening element being a bead which extends inwardly from the central band axially between the legs of the second element (3), and
wherein the first stiffening element and the second stiffening element each have an outwardly concave and inwardly convex cross sectional shape.

2. The connection device according to claim 1, wherein the first element (2) comprises a first safety portion (9) and the second element (3) comprises a second safety portion (12), the first safety portion (9) and the second safety portion (12) being arranged opposite one another at the second end region (14), and
wherein a third stiffening element (27) is arranged in a third transition region (26) between the first safety portion (9) and the second supporting portion (7), the third stiffening element being a bead which extends inwardly or outwardly from the central band between the legs of the second element (3), and
wherein a fourth stiffening element (27) is arranged in a fourth transition region (26) between the second safety portion (9) and the second supporting portion (7), the fourth stiffening element being a bead which extends inwardly or outwardly from the central band between the legs of the second element (3).

3. The connection device according to claim 1, wherein the first stiffening element (27) and the second stiffening element (27) extend centrally along a center axis (28) of the connection device (1), or wherein the first stiffening element and the second stiffening element are arranged offset relative to the center axis (28).

4. The connection device according to claim 1, wherein the first stiffening element (27) and the second stiffening element are arranged asymmetrically relative to a center axis (28) of the connecting device.

5. The connection device according to claim 1, wherein the first element (2) and the second element (3) are formed movably in the second end region (14) by a second connecting element (5), and
wherein the second connecting element (5) is formed as a chain link (5), and
wherein at least one of the first element (2) or the second element (3) is formed to be inserted through the chain link (5).

6. An exhaust gas turbocharger, comprising
a first casing section and
a second casing section,
wherein the first casing section and the second casing section are connected with each other by the connection device as in claim 1.

7. The exhaust gas turbocharger according to claim 6, wherein the first stiffening element (27) of the connection device (1) is offset relative to a center axis (28) of the connection device (1), and arranged at a smaller distance from a first of the two legs (25) of the connection device (1) which rests against the first casing section than from a second of the two legs (25) which rests against the second casing section.

8. The connection device according to claim 2, wherein the third stiffening element and the fourth stiffening element extend outwardly, having an outwardly convex and inwardly concave cross sectional shape.

9. The connection device according to claim 2, wherein the third stiffening element and the fourth stiffening element extend inwardly, having an outwardly concave and inwardly convex cross sectional shape.

10. An exhaust gas turbocharger, comprising
a first casing section, and
a second casing section,
wherein the first casing section and the second casing section are connected with each other by a connection device, the connection device comprising:
an essentially bent first element (2); and
an essentially bent second element (3),
wherein the first element (2) comprises a radially extending first clamping arm (8) in a first end region (13) of the connection device (1) and the second element (3) comprises a radially extending second clamping arm (11) in the first end region (13) opposite the first clamping arm (8), and
wherein the first element (2) is movably connected with the second element (3) in a second end region (14) of the connection device (1), which faces away from the first end region (13),
and wherein the first clamping arm (8) and the second clamping arm (11) may be movably connected by a first connecting element (4) of the connection device (1), and
wherein the first element (2) comprises a first supporting portion (6) and the second element (3) comprises a second supporting portion (7) between the first and the second end region (13, 14), the first supporting portion (6) and the second supporting portion (7) each having a U-shaped or trapezoidal cross-sectional profile with two legs (25) extending radially inwardly from a central band (24), and wherein a first stiffening element (27) is arranged in a first transition region (26) between the first clamping arm (8) and the first supporting portion (6), the first stiffening element being a bead which extends inwardly or outwardly from the central band axially between the legs of the first element (2), and wherein a second stiffening element (27) is arranged in a second transition region (26) between the second clamping arm (11) and the second supporting portion (7), the second stiffening element being a bead which extends inwardly or outwardly from the central band axially between the legs of the second element (3), and wherein the first stiffening element (27) of the connection device (1) is offset relative to a center axis (28) of the connection device (1), and arranged at a smaller distance from a first of the two legs (25) of the connection device (1) which rests against the first casing section than from a second of the two legs (25) which rests against the second casing section.

\* \* \* \* \*